United States Patent [19]

Berkland et al.

[11] Patent Number: 4,656,602

[45] Date of Patent: Apr. 7, 1987

[54] METHOD OF CONTROL PLACEMENT OF IMAGE OF DOCUMENT TO BE PRINTED ON PAPER IN AN INTERACTIVE TEXT PROCESSING SYSTEM

[75] Inventors: Philip T. Berkland, Leander; Allen W. Heath, Cedar Park; Grady K. Waddell, Austin, all of Tex.

[73] Assignee: International Business Machines Corporation, Armonk, N.Y.

[21] Appl. No.: 664,178

[22] Filed: Oct. 24, 1984

[51] Int. Cl.⁴ .............................................. G06F 3/12
[52] U.S. Cl. ................................... 364/900; 340/709; 340/711; 364/518; 364/519
[58] Field of Search ... 364/200 MS File, 900 MS File, 364/518, 519; 340/709, 711; 101/88, 87; 400/61, 62, 76

[56] References Cited

U.S. PATENT DOCUMENTS 4,460,975  7/1984  Torkelsen .......................... 364/900

OTHER PUBLICATIONS

"ADAM TM Family Computer System Smart-WRITER TM Word Processing" by Deborah J. Miller and Deborah Q. Voosen, Copyright 1983 by Robert J. Brady Co.

Primary Examiner—David Y. Eng
Assistant Examiner—Emily Y. Chan
Attorney, Agent, or Firm—R. E. Cummins

[57] ABSTRACT

A method controls the printing of documents created by interactive text processing systems so that the document image is positioned on the paper in the same location when the document is printed by two different printers with different paper positioning parameters. The method assists the operator in defining to the system the paper positioning parameters of each printer attached to the system so that the location of the first print position of the printer is established relative to the top and left edges of the paper. The text processing program also establishes the location of the first print (typing) position of the document image on the display relative to the top and left edges of the document image. Printer control codes are developed and sent to the printer which align the edges of the document image with the corresponding edges of the paper at its initial printing position by taking into account the relative locations of the first print positions of the printer and document image.

15 Claims, 9 Drawing Figures

F I G . 1

```
XXXXXXXXXXXXXXXXXXXXXXXXXXXXXXXXXXXXXX
             PRINTER DESCRIPTION TABLE SETUP
                    CLASS F .PDT
             PAPER HANDLING - PART 2 OF 2

ID  ITEM                                    YOUR CHOICE   POSSIBLE CHOICE
    FOR CONTINUOUS FORMS PAPER POSITIONING
A   MINIMUM TOP MARGIN                          0         0 - 1440/288 IN.
B   DEFAULT LEFT MARGIN - DISTANCE              0         0 - 1440/288 IN.
C   DEFAULT LEFT MARGIN - DIRECTION             2         1 LEFT OF EDGE
                                                          2 RIGHT OF EDGE

FOR MANUAL FORMS PAPER POSITIONING
D   MINIMUM TOP MARGIN                          0         0 - 1440/288 IN.
E   DEFAULT LEFT MARGIN - DISTANCE              0         0 - 1440/288 IN.
F   DEFAULT LEFT MARGIN - DIRECTION             2         1 LEFT OF EDGE
                                                          2 RIGHT OF EDGE

FOR AUTOMATICALLY FED PAPER POSITIONING
G   MINIMUM TOP MARGIN                          0         0 - 1440/288 IN.
H   DEFAULT LEFT MARGIN - DISTANCE              0         0 - 1440/288 IN.
I   DEFAULT LEFT MARGIN - DIRECTION             2         1 LEFT OF EDGE
                                                          2 RIGHT OF EDGE

PRESS F1 FOR HELP

TYPE ID LETTER TO CHOOSE ITEM; PRESS ENTER:

XXXXXXXXXXXXXXXXXXXXXXXXXXXXXXX
```

METHOD OF CONTROL PLACEMENT OF IMAGE OF DOCUMENT TO BE PRINTED ON PAPER IN AN INTERACTIVE TEXT PROCESSING SYSTEM

DESCRIPTION TECHNICAL FIELD

This invention relates in general to printing methods employed by interactive text processing systems and is directed specifically to an improved method to permit the operator of the system to control the alignment by the printer of the document image created by the system relative to the blank piece of paper at its initial printing position.

BACKGROUND ART

Interactive text processing systems generally comprise a microprocessor or personal computer, a keyboard which the operator uses to enter data into the system, a display device for displaying selected information to the operator, a diskette drive and diskette which function to transfer both text data and programs to and from the microprocessor, and lastly one or more printers for providing hard copy of documents that have been processed by the system. Next processing systems are interactive in the sense that the actions and responses of the operator and the corresponding reactions and responses of the system must be closely coupled and structured. The degree of interaction does vary among systems and is driven by considerations such as the number and complexity of the text processing tasks to be performed, the level of knowledge and experience of the intended operators with data processing systems in general and other text processing systems in particular, and a desire to appear "user friendly" to the prospective purchasers. Where the operator is expected to be relatively knowledgeable, the text processor is designed to respond to specific commands that the operator has committed to memory along with rules of syntax and a complete understanding of the function that will be performed by each command. Where the operators are expected to be less experienced the text processing program is usually designed to be more user friendly in that the operator is presented with a multilevel menu approach, each of which includes guidance information and prompts to assist the operator in selecting one of a plurality of options that are presented. The operator is not required to memorize any commands and is only expected to known the terms employed in the menus and the tasks that are to be accomplished. The ability of the system to assist the inexperienced operator in performing complex unfamiliar text processing tasks is important to the success and market acceptance since it bears directly on operator efficiency and attitude.

Text processing systems were initially dedicated systems in which the various system components including the text processing programs were designed and developed as a system from the beginning and generally reflected a consistent design philosophy throughout the entire system. Recently however, with the advent of reasonably priced personal computers, most text processing systems currently are not dedicated systems. The text processing application is only one of several applications that the system supports. As a result of the increased market growth two of the major components of a conventional text processing system, namely the text processing program and the printer, are in most cases no longer designed with each other in mind. The operator or user therefore generally faces one of two situations. The first is that the text processing program has a number of printer related functions which the printer attached to the system is incapable of performing or secondly the printer has been provided with a number of functions that are not supported by the text processing program.

The program which controls the overall printing function may or may not be an integral part of the text processing program. For purposes of the present discussion it will be assumed that the text processing program does include the printing function because the nature of the problems encountered by the operator are basically the same and result from the relatively large number and diversity of printer types that may be attached to the system and the even larger number and diversity of text processing programs that may be run by most personal computers.

Assuming however that the functions of the text processing program and the printer have been matched at the functional level, two other types of problems have to be addressed. The first is basically a communications problem in that while a degree of standardization exists in the encoding of text characters (i.e. ASCII standard) there is no agreed standard on printer control character sequences that control the formatting of the document during printing among either the developers of the text processing programs or the developers of the printers. As a result such mundane situations as indicating that the end of a line has been reached is manifested by at least two different control sequences so that unless the text processor program or the print program for the system knows how that particular control is interpreted by the attached printer, the printer may or may not also cause a line feed to occur. The second type of problem which may be encountered relates to the positioning of the document image on the paper and results primarily from the fact that printers have various paper handling and positioning mechanisms and systems. This causes the position of the top and side edges of the paper relative to the home position of the print element to be different for different printers.

The first problem is addressed by the method and system described and claimed in co-pending application Ser. No. 664,181 filed concurrently herewith in the name of Allen Heath, titled TABLE DRIVEN PRINT FORMATTING, and assigned to the assignee of the present invention. The second problem is addressed in this application which describes a method and system that permits the operator to interactively enter into the system the data concerning the paper positioning parameters and characteristics of each printer attached to the system so that the same document image printed by two printers attached to the system and having different paper positioning characteristics will nevertheless produce two documents which are substantially identical. Such an arrangement is advantageous from a practical standpoint where the text processing system has a relatively fast dot matrix printer which is used for printing draft copies and also a slower high quality letter quality printer. The dot matrix printer conventionally employs a pin-feed tractor mechanism for moving continuous fan-folded paper relative to the horizontal print line traversed by the print head. The letter quality printer on the other hand is likely to employ an automatic sheet feed mechanism that is capable of feeding letter head sheets from one draw, plain second sheets from a second drawer, and envelopes from a third position. Being able to print the draft copy with the image of the document placed exactly as it will appear on the final copy avoids the situation of the operator having to mentally transpose the image to the final copy only to find out after it is actually printed that it is not acceptable.

The disclosed method is also advantageously employed in situations where document interchange occurs frequently between systems having different printers. An example of this occurs where documents are distributed by sending the magnetic media or where the document is sent by "electronic mail".

SUMMARY OF THE INVENTION

In accordance with the present invention, a method is provided for use in an interactive text processing system which permits the operator to interactively define to the system the location of the top and side edges of the paper relative to the home print position of the print element when the paper is initially positioned immediately prior to printing. Since the text processing program has defined the corresponding edges of the document image, the method functions to the extent permitted by the printer, to send appropriate control sequences to the printer which reflect the paper positioning parameters previously entered into the system to align the edges of the image with the edges of the paper.

It is therefore an object of the present invention to provide an improved method for printing documents on printers attached to interactive text processing systems.

Another object of the present invention to provide an improved method to control the placement of document images on paper by printers which have different paper handling characteristics.

A further object of the present invention is to provide an improved method which allows the operator of an interactive text processing system having two output printers which initialize the paper to different positions relative to the home positions of their respective print elements, to place the image of the document identically on both sheets of paper.

Objects and advantages other than those mentioned above will become more apparent from the following description when read in connection with the drawing.

DESCRIPTION OF THE PREFERRED EMBODIMENT

Figure 1:
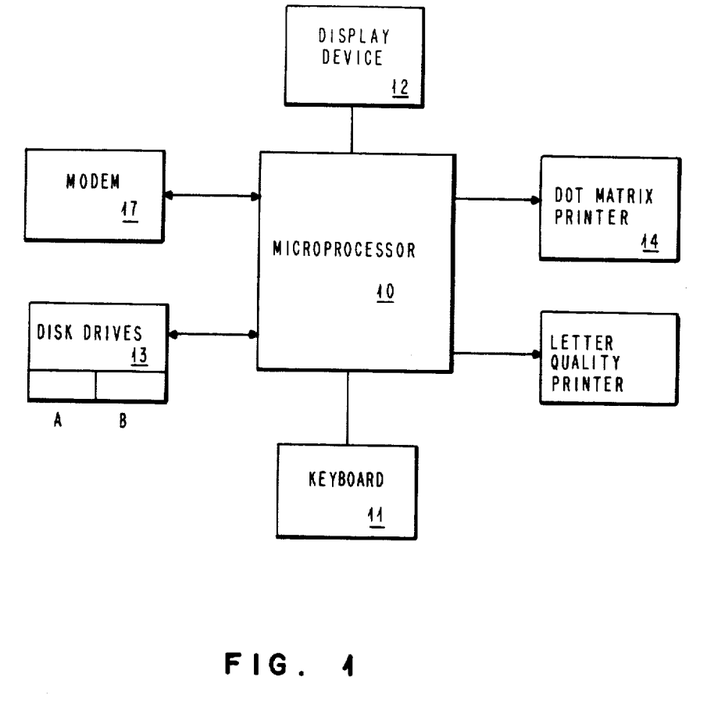
FIG. 1 illustrates diagrammatically a typical interactive text processing system.

FIG. 1 illustrates the general arrangement of a typical interactive text processing system. As shown the system comprises a microprocessor 10, a keyboard 11, display device 12, a pair of diskette drives 13A and 13B, a dot matrix printer 14, and a modem 17 for communicating with other information handling systems.

The system as shown could be either a dedicated text processing system or a personal computer performing a text processing application by virtue of the operator having placed a text processing program diskette into one of the diskette drives and requesting, by data entered into the system through the keyboard, that the program be loaded. For purposes of discussion it will be assumed that the system employs an IBM personal computer in which case the microprocessor 10 and diskette drives 13A and 13B would be packaged as a unit. It can also be assumed that the personal computer is operating under an operating system such as DOS 2.1 and that the DisplayWrite II text processing program was the program loaded by the operator. It can be further assumed that the operator has set the various system defaults into the program and that a diskette has been placed in drive 13B for storing any document created by the system. The DisplayWrite II program is a highly interactive, menu driven, extremely sophisticated text processing program designed for use by relatively inexperienced operators. As a result when the program is loaded the operator is presented with a task selection menu on the screen of the display device 12 which lists all of the possible text processing tasks that the system supports plus some system house keeping type tasks, some of which have command oriented counterparts in the DOS operating system. For example the DOS commands such as Copy and Erase have been duplicated in DisplayWrite II program but in a menu implementation.

One option provided to the operator on the task selection menu is to create a document. Selection of this task (by keying in the item number assigned to the task on the menu) results in the item description being highlighted and a prompt appearing on line 24 of the screen advising the operator to name the document and then press the enter key. A second menu is then presented which allows the operator to insert a short description of the document and the document format description that defines the relationship of the 0,0 coordinates of the text image to the 0,0 coordinates of the paper. After the description is entered into the system, a document creation screen is presented. This screen is basically a blank screen having a header field of descriptive data, a cursor that has been positioned at the 0,0 coordinates of the text image, and a message and prompt line at the bottom of the screen.

If the first typing line has been set to other than line 1 in the system defaults, e.g. line 7, then line 7 appears as the first typing line on the screen and this fact is indicated by the data in the header line of the screen. In some other text processing programs, the top of the document image, i.e. line 1, is always at the top of the screen at the beginning of documentation creation. The same situation occurs relative to the left edge of the text image and the left of the document image.

At that point in the process the operator begins typing the document and the text appears on the screen. Line lengths, paragraph indents, etc. are treated as previously established in the default format unless the operator desires to change them temporarily for a portion or all of this document. At the end of the document the operator presses a function key indicating to the system that the end of the document has been reached. The system, i.e. the microprocessor, responds to the end of document signal and causes a copy of the document to be recorded on the data diskette in drive 13B and thereafter returns the system to the point where the main task selection menu is again displayed to the operator.

Assume that the operator wants a draft copy of the document for review and editing by the author. The operator therefore selects the print option from the task selection menu and is presented with a menu containing a number of options which can be selected depending on the desired appearance, e.g. starting page number. Previous to this point, the operator has entered into the Printer Description Table, data on the various parameters of the printer and various default printer settings. At this point, the operator must manually inspect the position of the paper in the printer to insure that the paper is positioned as described by the Printer Description Table.

Since the draft copy is to be printed on the dot matrix printer, the operator would select the matrix printer as the destination conversion type, and choose draft printing for the method of producing the printed copy. The final text image that is created by the text processor has logical vertical and horizontal edges defined by white space that is commonly referred to as top/bottom and left/right margins. The text processing system places the text image relative to column 0 line 0 of the document image by using margins requested by the operator for this document and saved within the document format description.

On many dot matrix type printers, the print head travel is fixed to about 8 inches which allows 80 1 normal character or 132 condensed characters per line. To a limited extent the pin wheels which feed the paper in the "Y" direction may be adjusted to accommodate smaller width forms or to control where the first character will be printed relative to the left perforated edge of the sheet. However with an 8½ inch width paper and an 8 inch print line, the amount of the adjustment obtainable by horizontal adjustment of the pin wheels is limited. Normally the paper is centered such that the 8 inch print line has ¼ of an inch on each side of the line. This now illustrates part of the problem. If the document defaults requested a 1 inch left margin, then the text processing system would normally provide a 1 inch space between the left edge of the document image and the left edge of the text image. However, the paper is in this case offset by ¼ of an inch, relative to the first print position, thus what would be placed on the paper is the text image with a 1 and ¼ inch left margin. As to the vertical registration of the document, the perforations between sheets should be placed just above the print element to line 0. If the paper is not positioned as such (for reasons such as the limitations of the printer or for convenience of other applications executing on the same general purpose printer), then the vertical registration will be incorrect also.

If the operator tries to correct the situation by changing the document formatting information such that the document specified ¾ of an inch, then the document would have a 1 inch margin on this printer. However, when printed on another printer that had no horizontal offset, then the document would be printed inconsistently.

While the main function of the draft copy is generally to permit review and editing by the author, it can also provide the operator with a basis for enhancing the appearance of the final copy. As discussed briefly in the beginning of the specification, unless the printers can place the document image on the draft and final copies in exactly the same location on the paper, a degree of judgment must be exercised by the operator attempting to envision how the draft copy will appear when printed in final form. It is assumed that the letter quality printer has an automatic paper feed which initially positions the paper relative to the home position of the print head so that the first print position is on line 7, column 1. It will be seen that under that assumption the document image will be offset in both the vertical and horizontal directions relative to the image on the draft copy.

The present invention provides a method to avoid offsetting the images by permitting the operator to interactively enter into the system the data about the initial paper positioning parameters of each printer and the paper positioning characteristics or capabilities of the printer. When the final copy of the document is printed, the method causes the appropriate printer controls to be embedded in the printable text data stream that is sent to the printer. The printer controls reflect the initial position of the paper relative to the home print position so that the documents printed by both printers are substantial duplicates in appearance.

Figure 2:
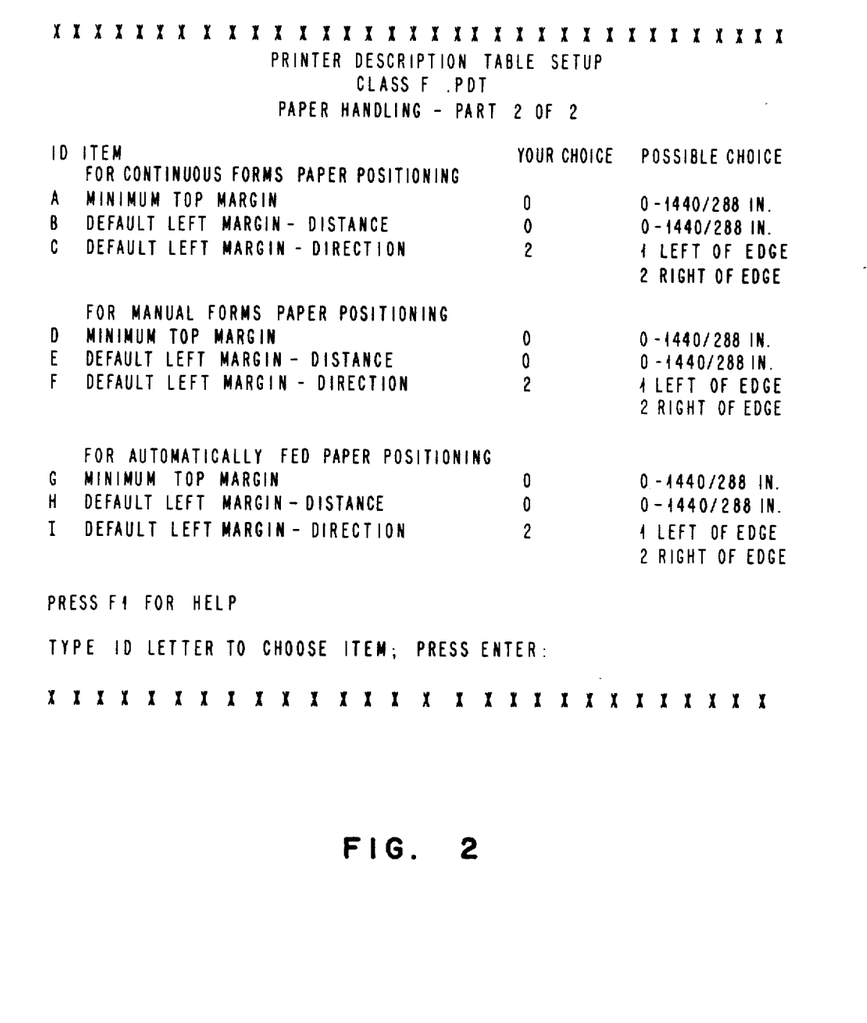
FIG. 2 illustrates the menu which is displayed to the operator of the system shown in FIG. 1 during the step in which the paper positioning parameters of the printer are defined to the system.

FIG. 2 is an example of the menu that is presented to the operator which permits the operator to interactively enter data about the paper handling capabilities of the printers attached to the system. As shown the menu is for gathering specific data for the Printer Description Table (PDT) setup. The menu is one of a Series of menus that are presented to the operator at the time the overall system is initialized which lets the system know the characteristics of the various units that are attached. This particular menu shown is one of a series relating to the printer(s) that are attached to the system and specifically the paper handling parameters and characteristics of these printers. The menu may be presented in response to entering a specific printer set up program which may or may not be a part of the text processing program.

This table is stored in memory and used by the Print function program in a manner that is described in the cross-referenced application and later on in this specification relative to this specific method. FIG. 2 is part two of the table set up menu sequence and as indicated is for printers of the Class "F" type which is all printers that have not been identified in the previous classes. The class is designed to permit the operator to enter data for any printer that may be marketed in the future.

The menu requests the operator to enter data relative to three separate items for three different types of paper positioning systems; a continuous fan-fold tractor fed type, a manual feed for single cut sheets of paper and an automatic feed for cut sheets of paper. For each type of paper positioning system employed by the printer, the operator is requested to specify the minimum top margin, the default for the left margin distance and the default for the left margin direction. The term margin as used in the menu refers to the location on the paper of home print position for the printer. The choices provided by the menu for the operator to enter are values between 0 and 1440/288 inches. In other words the operator can specify any distance value between 0 and 5 inches in 288ths of an inch for the distance values of items a,b,d,e,g and h. Items c,f and i are directional choices represented by the entry of digits 1 for "left of paper edge" or 2 for "right of paper edge".

It should be understood that the units of distance may be other than inches and that the 5 inch value is merely representative of the value employed by a number of printers.

The menu also includes a prompt advising the operator to press F1 (Function Key F1) for help in entering the data. The two "HELP" screens that can be displayed are illustrated below as "HELP" 1 and "HELP" 2.

| PRINTER DESCRIPTION TABLE SETUP | | |
|---|---|---|
| HELP | PAGE XX CLASS F PDT | PANEL 4 |
| | PAPER HANDLING | |

Since printers support one or more different kinds of paper handling devices, three separate sets of control sequences provide for unique control for each kind. The values are entered in units of 1/288th inch to provide accuracy in placing characters on the paper.

MINIMUM TOP MARGIN

If your printer begins printing each sheet of paper part way down from the top edge of the paper, you need to define the Minimum Top Margin. If you define a Reverse Index in the Advanced Printing Functions Menu, the program attempts to position the paper to receive the printed characters on the line specified in the document. Some printers do not allow printing in the Minimum Top Margin area, and others allow it, but with the operator responsible for paper bail closure. For example, if your printer allows for one inch top margin, the Minimun Top Margin would have a value of 288 (in units of 1/288 inch).
ESC to end HELP PG DN or PG UP for more HOME for Table of Contents

HELP 1

| PRINTER DESCRIPTION TABLE SETUP | | |
|---|---|---|
| HELP | PAGE XX CLASS F PDT | PANEL 5 |
| | PAPER HANDLING | |

DEFAULT LEFT MARGIN

If your printer cannot print all the way to the left edge of the sheet, or prints each line beginning to the left of the left edge of the paper, then you need to define the Default Left Margin. You must also indicate if this left margin is to the left or right of the left edge of the sheet of paper.
For example, your printer may provide for four 10 pitch character spaces between the left paper perforations and the first printable character position. In this case, the Default Left Margin Distance would be 0.4 inch. Converting this to units of 1/288ths of an inch would give a value of 116 (rounding up). The direction would be "RIGHT" of the left paper edge.
ESC to end HELP PG DN or PG UP for more HOME for table of contents

HELP 2

The operator enters the requested information for both printers 14, and 15. The manner in which the system shown in FIG. 1 operates to align the document images on the pieces of paper in the printers 14 and 15 will now be described in connection with the flow charts shown in FIGS. 3a through 3g.

Figure 3A:
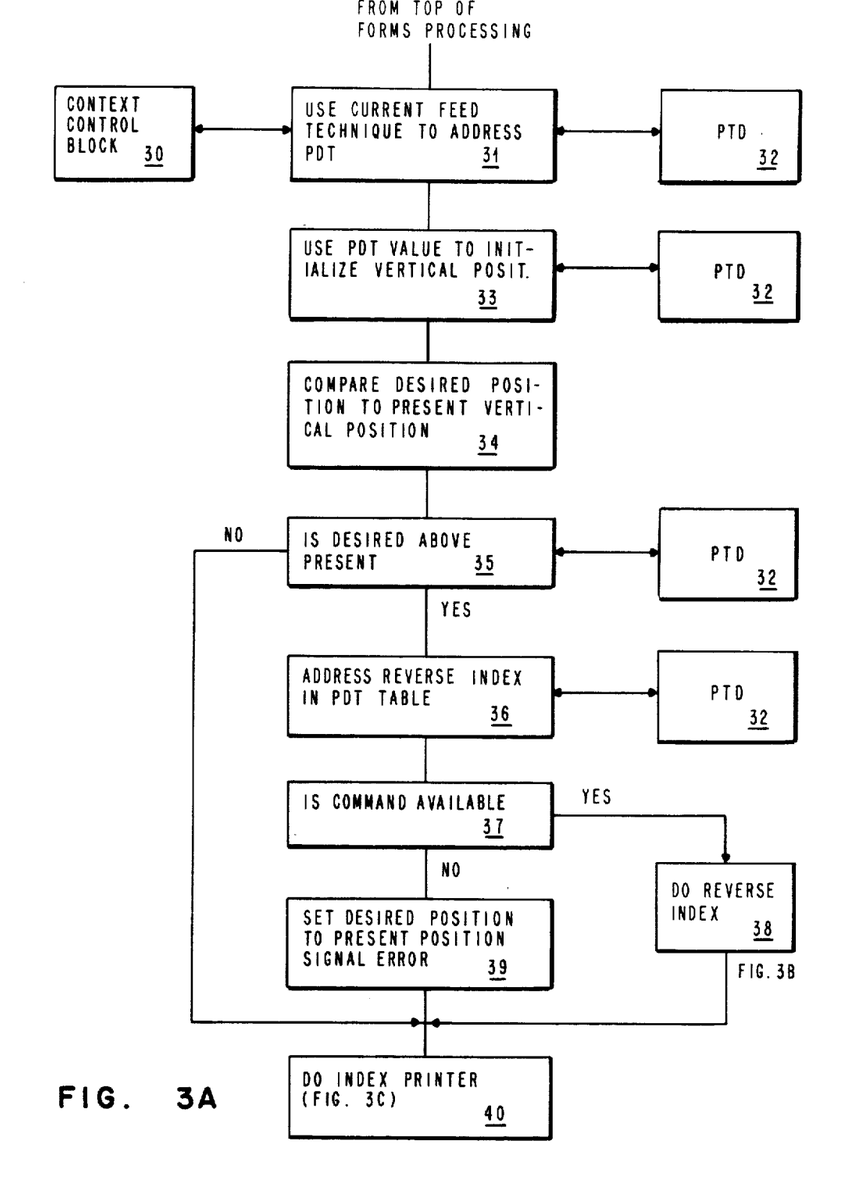
FIGS. 3a-3g are flow charts depicting the steps involved by the system shown in FIG. 1 in implementing the method of the present invention.

FIGS. 3a through 3e are directed to the steps involved in adjusting the paper in the vertical direction to align the top edge of the document page (which includes the document image and document margins) with the top edge of the paper. FIGS. 3f and 3g are directed to the steps involved in setting the left margin and the horizontal positioning controls.

It should be understood that these flow charts are directed to specific steps involved in the alignment of the edges of the document image with the corresponding edges of the paper and are merely segments or subroutines of the much larger Printer Control Program. Some of the illustrated blocks such as the "Context Control Block" (CCB) illustrated in many of the charts are established control blocks used throughout the Printer Control Program (PCP) and employed to keep track of where the program has been and where it presently is since in processing a line of text stored in a print buffer, the line is often scanned many times depending on the type of printer controls that are encountered. Similarly the Printer Description Table (PDT) is referred to throughout the PCP. It is assumed that the paper has been positioned in the printer by other routines and that the flow in FIG. 3a is the segment that is to do the "top of forms processing". Block 31 references the CCB 30 and fetches the data from the PDT 32 as to the desired vertical position. Block 33 initializes the entered value of the vertical position prior to comparing the two values in Block 34. Block 35 checks to see if the desired position is above the present line position of the paper. If it is not, then the system proceeds to Block 40 which controls the indexing of the printer in the upward vertical direction. If Block 35 determines that the desired position is above the present position, Blocks 36 and 37 function to determine if a "reverse index" function command is available. If it is not, Block 39 sets the desired position to the current position. If a "reverse index" function is available, Block 38 provides the "reverse index" which is shown in detail in FIG. 3b.

Figure 3B:
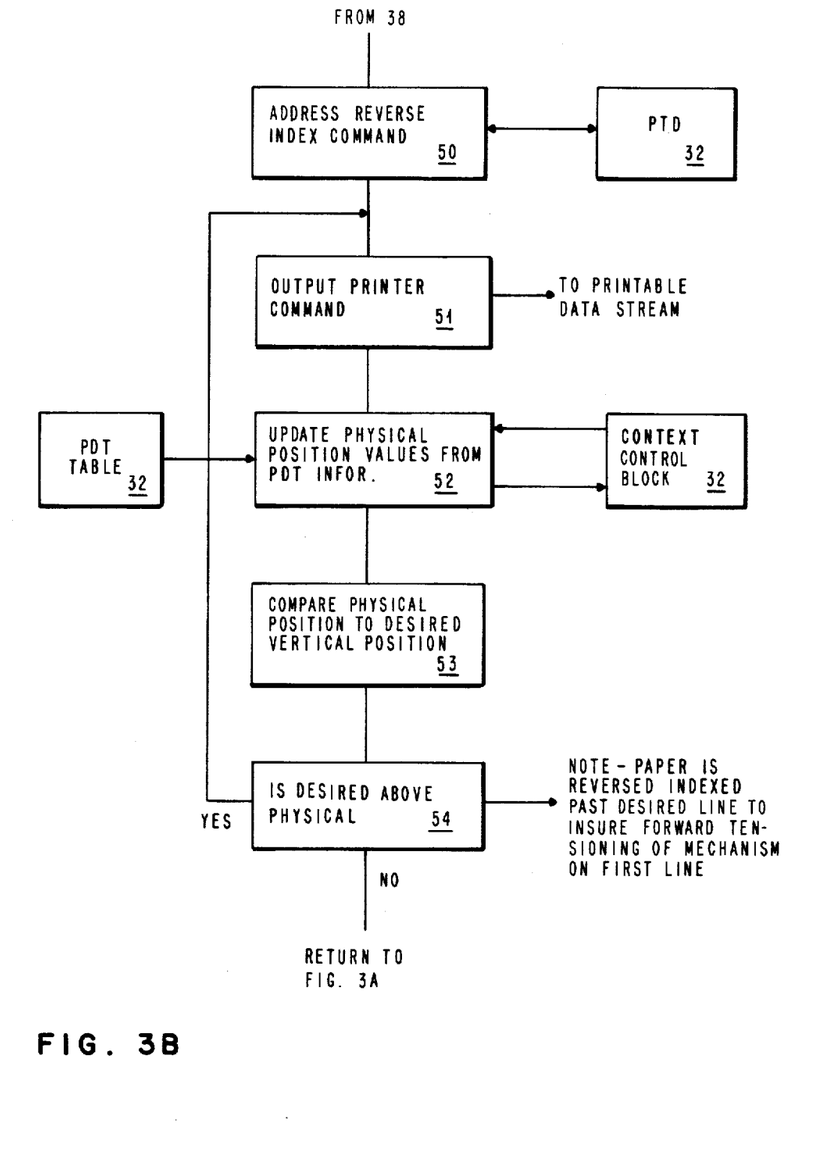
Figure 3C:
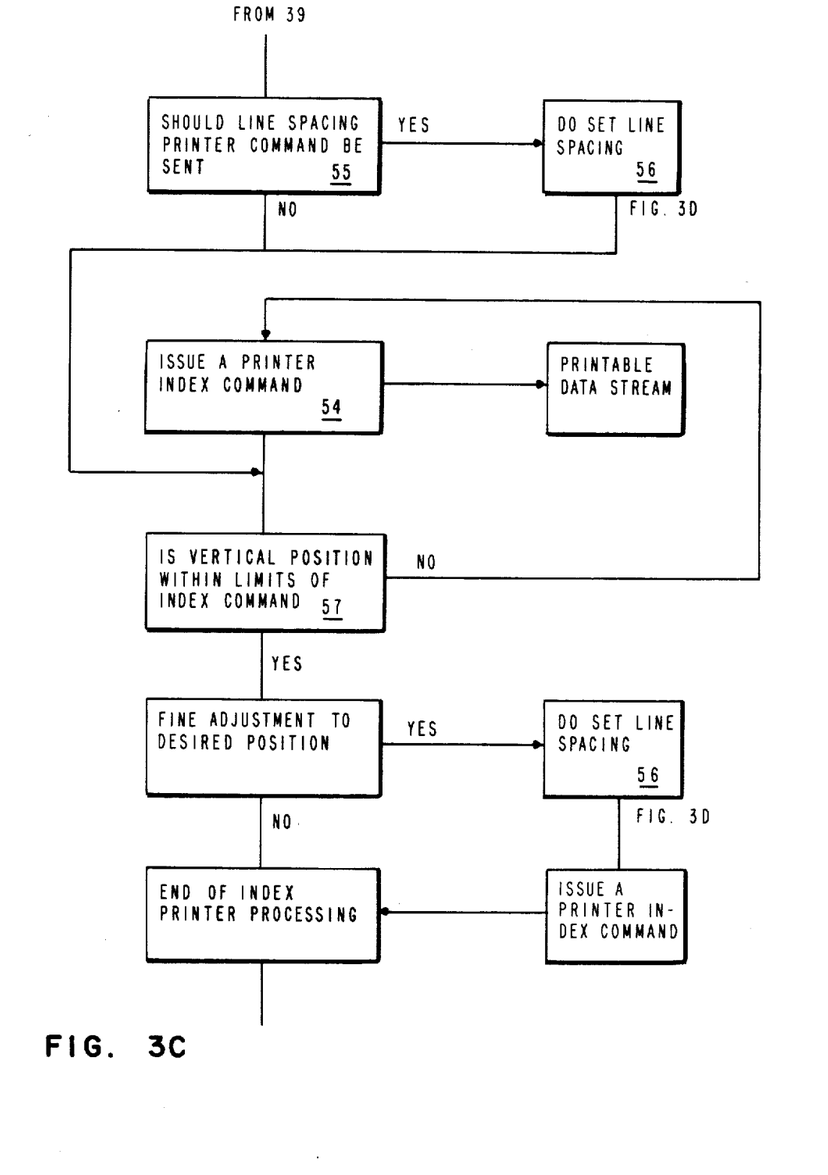

FIG. 3b is relatively self explanatory and corresponds generally to an ordinary reverse index operation. The printer is reversed indexed one line above the desired line and then later indexed in the forward direction to insure that the mechanical components, such as the gears, are tensioned correctly from the start of the printing operation. The forward index operation is shown in FIG. 3c and reflects the fact that in order to make the vertical alignment as accurate as possible, the line spacing can be altered when the printer supports such a function.

Figure 3D:
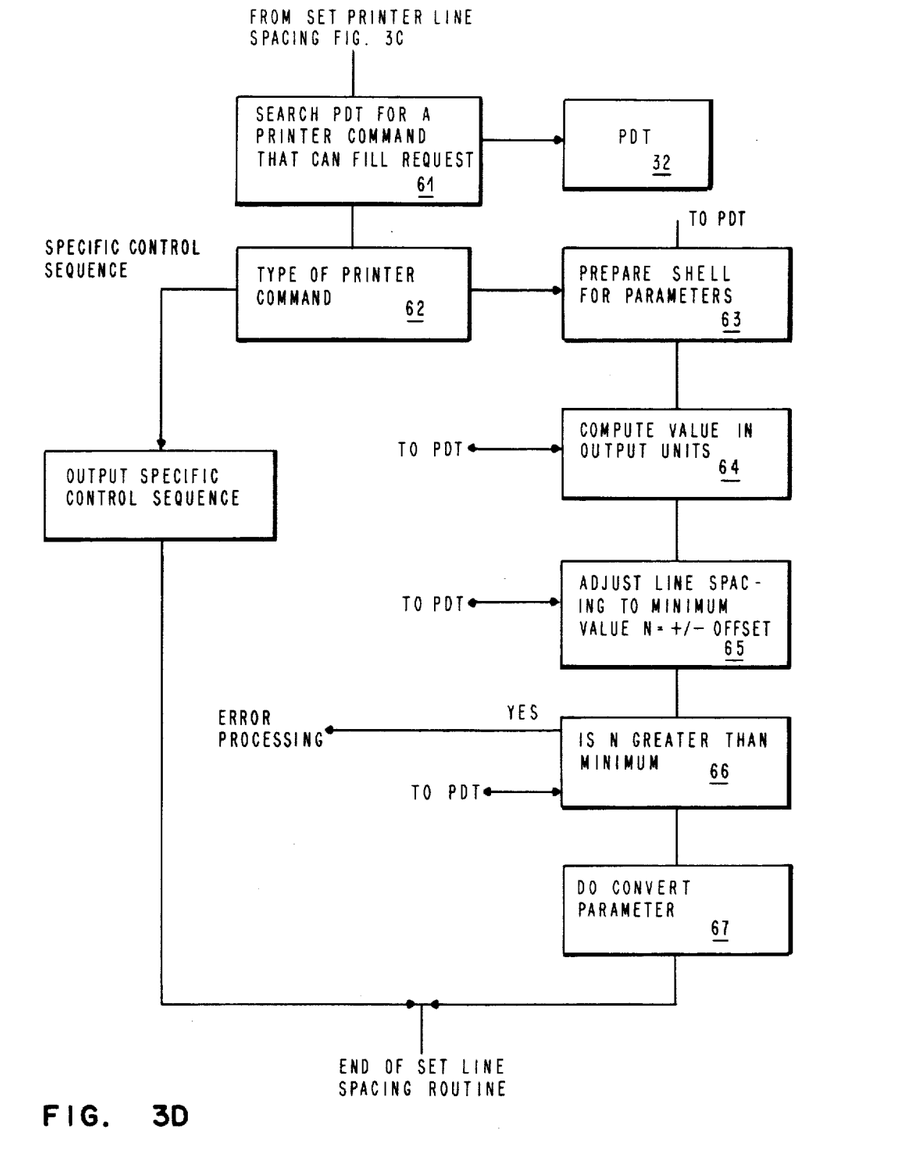
Figure 3E:
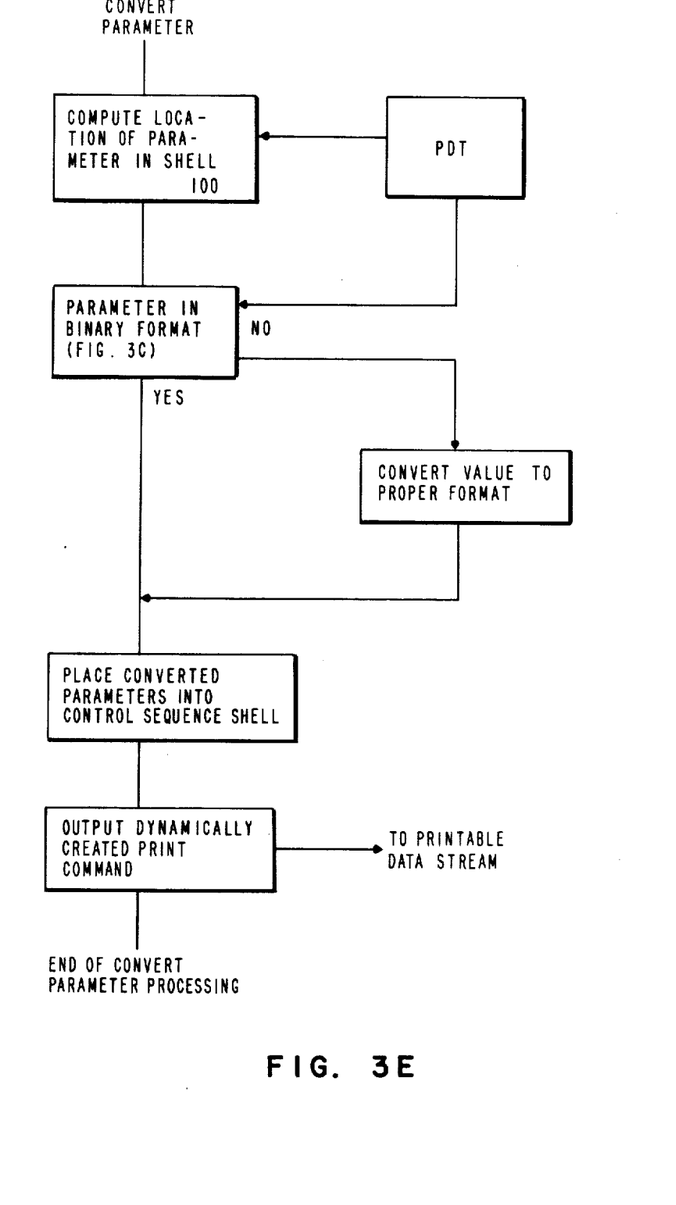
Figure 3F:
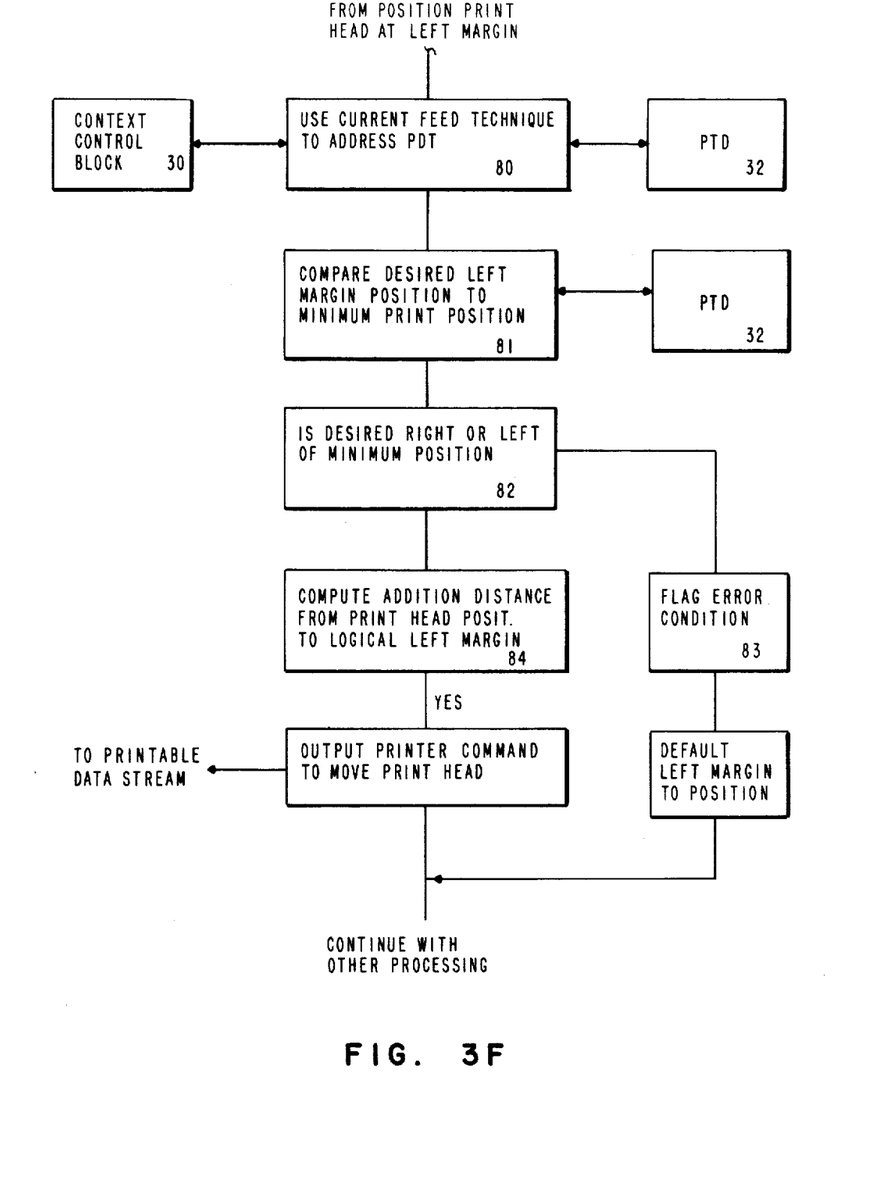
Figure 3G:
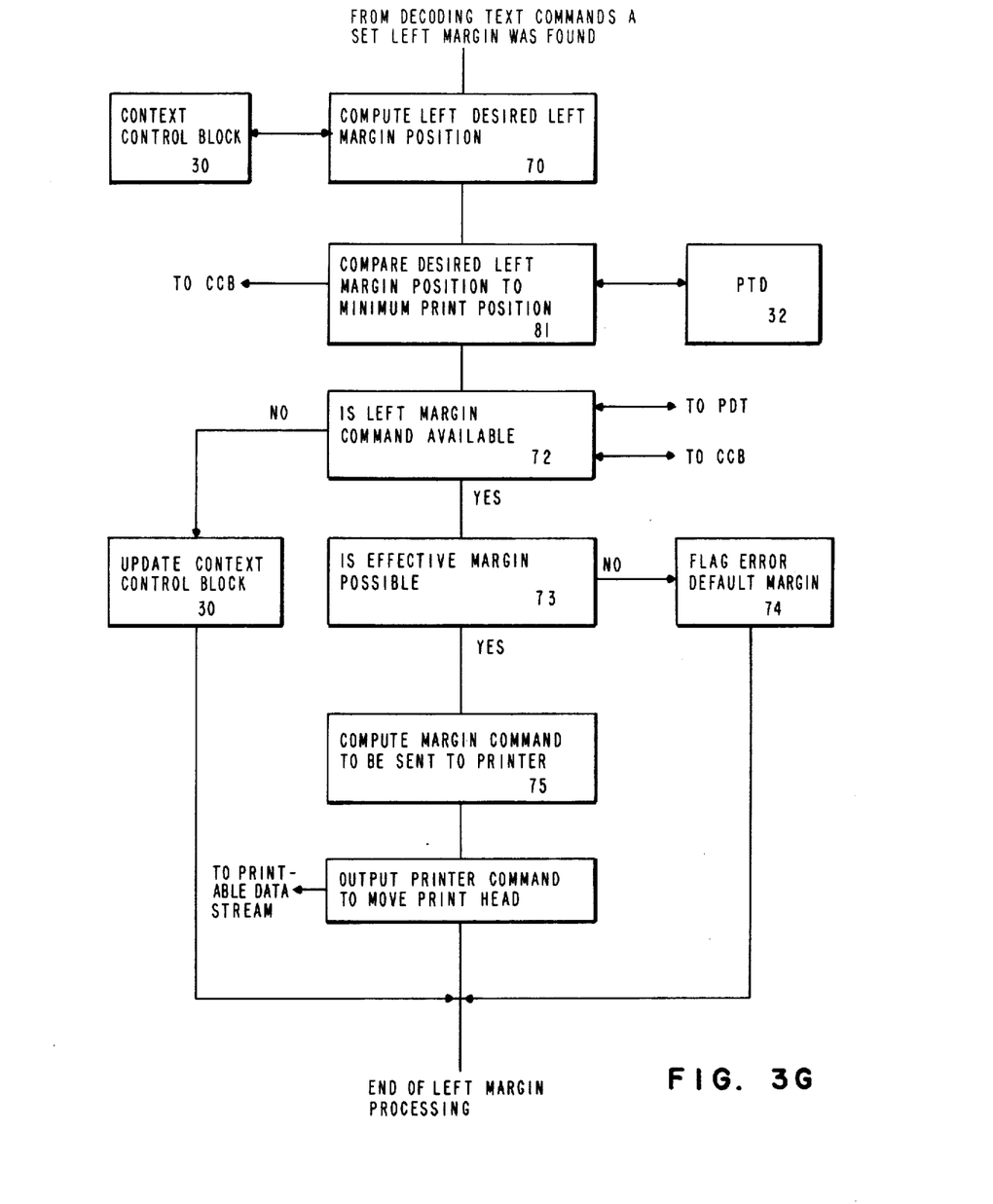

Block 55 determines if a Line Spacing Printer command should be sent to the printer and Block 56 does the line spacing as shown in detail in FIG. 3d. Block 57 determines if the desired and present positions are within the limits of an index command with the current line spacing value. If they are not Block 58 issues an index command to the printable data stream. This loop is repeated until Block 37 indicates that the two positions are within the range of of the index command. At that point a fine adjusting mode is entered by resetting the line spacing as shown in FIG. 3d and issuing the last index command to the printable data stream.

The steps illustrated in FIG. 3d involve the use of the method of developing print commands described in the previously referenced co-pending application. Block 61 searches the PDT for a printer command that can fulfill the positioning requirements. Block 62 determines if a specific control sequence is available or whether the values are to be computed and inserted into the general control sequence shell in accordance with the cross-referenced application. Blocks 63 through 67 and the flow chart of FIG. 3e create the Printer Command Dynamically and issue it to the Printable Data Stream to conclude the index processing routines. At this point in the process the top edge of the document image is aligned with the top edge of the paper.

The flow charts of FIGS. 3g and 3h illustrate the steps involved in the alignment of the left edges of the image and paper. This portion of the alignment begins with the "Set Left Margin" command being recognized in the text data stream. Block 70 computes the desired left margin while Block 71 determines the amount of adjustment that is required. Block 72 determines by reference to the PDT and the CCB whether a Left Margin control is available for this printer. If no control is available the Left Margin routine is concluded in updating the CCB 30. If the control is available Block 73 determines if the control is sufficient to align the left edges. If not, a flag is set and and error signaled by Block 74. If the control is sufficient Block 75 computes the value for the margin command to align the edges while Block 76 sends the dynamically created command to the printable data stream to complete the Left Margin Processing.

FIG. 3f sets forth the horizontal position adjustment steps. Blocks 80, 81 and 82 determine if the left margin is to the right or equal to the minimum left margin position of this printer. If the desired position is to the left of the of the minimum position then an error condition is set by Block 83 and the Default Left Margin is used. If however the desired position is to the right or equal to the minimum, the difference is computed by Block 84 and an output printer command to move the head is sent to the Printable Data Stream. This aligns the left edge of the image with the left edge of the paper.

The following paragraphs set forth programming language statements which persons skilled in the art of programming interactive text processing systems will find informative in connection with implementing the method described in the specification and defined by the claims.

The first two sets of code are directed to the functions involved in setting the left margins.

```
1.  BEGIN PROCEDURE SET MARGINS
2.  GET LEFT MARGIN VALUE INFORMATION FROM
    TEXT DATA STREAM
2.  CONVERT TO INTERNAL ABSOLUTE DISTANCE
2.  IF LEFT MARGIN CHANGE REQUESTED
3.  IF MIDLINE MARGIN CHANGE
4.  SAVE PRESENT OFFSET FROM CURRENT
    LEFT MARGIN AS TEMPORARY MARGIN OFFSET
3.  ELSE BEGINNING OF LINE CHANGE
4.  IF FIRST PASS ON THE LINE
5.  CLEAR TEMPORARY MARGIN OFFSET
5.  IF MARGIN CONTROL AVAILABLE
6.  CALL GENMRGN TO FORMAT AND OUTPUT
    MARGIN COMMAND TO THE PRINTER
5.  END IF
4.  END IF
3.  END IF
2.  END IF
1.  END PROCEDURE SET MARGINS
1.  BEGIN PROCEDURE GENMRGN (GENERAL
    MARGINS)
2.  COMPUTE DISTANCE OF THE EFFECTIVE MARGIN
    BY USING THE TEXT REQUESTED MARGIN VALUE
    AND THE MARGIN PROVIDED BY THE PRINTER AS
    SAVED IN THE PRINTER DESCRIPTION TABLE.
2.  IF PRINTER MARGIN CONTROL AVAILABLE AND
    USEABLE
3.  ADDRESS MARGIN SUBSTRUCTURE OF PDT
3.  IF MARGIN CAN BE EXPRESSED IN INCHES
4.  IF MARGIN IS TOO BIG FOR PRINTER
5.  SET MANUAL MARGIN MAINTENANCE
    MODE (MARGIN CONTROL UNUSABLE)
5.  RESET MARGIN TO LOGICAL 0
4.  END IF
4.  CONVERT THE EFFECTIVE MARGIN DISTANCE
    INTO ABSOLUTE DISTANCE UNITS EXPECTED
    BY THE PRINTER (INCHES OR FRACTIONS
    THEREOF)
3.  ELSE MARGIN IS SET IN COLUMNS
4.  IF MARGIN IS TOO BIG FOR PRINTER
5.  SET MANUAL MARGIN MAINTENANCE
    MODE (MARGIN CONTROL UNUSABLE)
5.  RESET MARGIN TO LOGICAL 0
4.  CONVERT THE EFFECTIVE MARGIN DISTANCE
    INTO NUMBER OF CHARACTERS AT A GIVEN
    PITCH.
4.  END IF
3.  END IF
3.  CALL GENERAL PARAMETER TO FORMAT PRINTER
    COMMAND SHELL WITH COMPUTED PARAMETER
2.  END IF
```

```
1.  END PROCEDURE GNMRGN
```

The following code is directed to the ejecting and feeding of paper, the top of forms processing involving the vertical indexing operations, and the horizontal positioning function of the print head. Two routines are illustrated.

```
1.  BEGIN PROCEDURE IMAGE
2.  SAVE CONVERSION ENVIRONMENT
2.  IF TRANSITIONING TO IMAGE STATE
4.  IF TOP OF FORM
5.  ENABLE PAPER SENSOR
4.  ELSE TURN OFF PAPER SENSING TO
    ALLOW PRINTING TO BOTTOM OF PAGE
4.  END IF
4.  IF LAST PAGE NOT EJECTED
5.  PERFORM THE PENDING PAGE EJECT
4.  END IF
4.  IF TOP OF FORM AND AUTOMATIC FEED
5.  FEED PAPER FROM CORRECT DRAWER
4.  END IF
4.  IF PRINTER LINE SPACING IS
    INCORRECT FOR ⅙ INDEX COMMAND
5.  FORMAT AND SEND THE PROPER SET LINE
    SPACING PRINTER COMMAND
4.  END IF
4.  CHECK TYPE STYLE LINE REQUIREMENTS
4.  DEFINE CURRENT PASS
4.  IF INDEX IS NEEDED TO GET TO CURRENT
    PASS VERTICAL POSITION
5.  INDEX TO LOGICAL Y POSITION
4.  END IF
3.  DO FRSTPPNT TO GO TO FIRST PRINTING POSI-
    TION
3.  SET IMAGE STATE
2.  END IF
2.  IF AT PHYSICAL LEFT PAPER EDGE
3.  GO TO FIRST PRINTING POSITION
2.  END IF
2.  RESTORE CONVERSION ENVIRONMENT
1.  END PROCEDURE IMAGE
```

The following code is directed to positioning the head to the first print position.

```
1.  BEGIN PROCEDURE FRSTPPNT (FIRST PRINT
    POINT)
2.  IF A MULTIPLE PASS LINE
3.  CARRIAGE RETURN TO LEFT CARRIAGE
    STOP OR MARGIN AS APPROPRIATE
3.  IF ZICR NOT SUPPORTED BY PRINTER
4.  SET FORMATTING ERROR
3.  END IF
2.  RESET BOLD, UNDERSCORE, ETC PRINTER MODES
    BY ISSUING THE PROPER COMMANDS
2.  IF LEFT MARGIN CONTROL AVAILABLE
3.  SET CURRENT POSITION TO LEFT MARGIN
2.  ELSE SPACE OUT FROM CARRIAGE STOP TO
    EFFECTIVE LEFT MARGIN (ADJUSTED FOR
    PRINTER PAPER POSITIONING QUIRKS)
3.  UPDATE X POSITION TO REFLECT SPACING
    TO THE LEFT MARGIN
2.  END IF
2.  SET ACTIVE PITCH IF REQUIRED
2.  IF FIRST PRINT POINT IS TO THE RIGHT OF
    LEFT MARGIN
3.  INSERT ADDITIONAL SPACES TO DESIRED PRINT
    POSITION
2.  END IF (NOW AT CORRECT POSITION)
2.  SET BOLD, UNDERSCORE, ETC PRINTER MODES BY
    ISSUING THE PROPER COMMANDS IF MODE IS
    APPROPRIATE AT THIS TIME
1.  END PROCEDURE FRSTPPNT
```

The following code is directed to the vertical positioning operation involving indexing the printer from the physical position to a logical position.

```
1. BEGIN PROCEDURE INDEXPTR
2.   IF REQUESTED POSITION IS ABOVE
     PHYSICAL POSITION
3.     IF POSSIBLE TO MOVE BACKWARD
4.       REVERSE INDEX TO ABOVE THE
         POSITION
3.     ELSE SET LOGICAL POSITION TO
       PHYSICAL POSITION
4.       FLAG UNSUPPORTED FUNCTION AS THE
         ERROR CONDITION
3.     END IF
2.   END IF
2.   INDEX WHOLE LF COMMANDS TO LOGICAL
     POSITION
2.   IF LOGICAL VS PHYSICAL Y POSITION ARE
     STILL DIFFERENT
3.     IF PRINTER INCAPABLE OF A FINE ADJUSTMENT
       OF THAT MAGNITUDE
3.       THEN FLAG UNSUPPORTED LINESPACING ERROR
3.     ELSE OUTPUT CONTROL TO MOVE THAT
       DISTANCE
3.     END IF
2.   END IF
1. END PROCEDURE INDEXPTR
```

The following code process the text data requests for a specific paper feed operation and provides system defaults for unsupported requests. It uses data from the PDT based on the request, e.g. manual sheet feed, and saves the information for the top-of-form and beginning print positioning operations on subsequent sheets.

```
1. BEGIN PROCEDURE PPM (PAGE PRESENTATION
   MEDIA)
2.   ADDRESS TEXT COMMAND AND PDT
2.   IF EXPLICIT AUTOMATIC FEED REQUESTED
     BY TEXT
3.     SET AUTOMATIC FEED SELECTION
3.     CREATE DRAWER SELECTION INDEX
3.     IF REQUESTED AUTOMATIC FEED TYPE
       REQUESTED BUT NOT AVAILABLE
4.       FORCE MANUAL FEED REQUEST
3.     END IF
2.   END IF
2.   IF MANUAL FEED REQUESTED
3.     SET A FEED IS PENDING
2.   END IF
2.   SET HARDWARE PAPER LOADING CORRECTIONS
     FROM PDT USING FEED TECHNIQUE
2.   SET PRINTER'S ACTIVE MARGIN BASED ON
     NEW PAPER FEED TECHNIQUE
1. END PROCEDURE PPM
```

While the invention has been particularly shown and described with reference to a preferred embodiment thereof, it will be understood by those skilled in the art that various changes in the form and details may be made without departing from the scope and spirit of the invention.

What is claimed is:

1. A method to assist the operator of an interactive text processing system having a printer to control the placement by said system of a document image on a sheet of paper in said printer, said printer having a home print position which is offset a predetermined distance from at least the left edge or top edge of said paper after said paper is positioned to the initial print position of said printer, said document image comprising a text image including a first line that has a predetermined position relative to at least the left side or top side of said document image said method comprising the steps of,
   (a) interactively entering into said system the initial paper positioning parameters of said printer, including said predetermined distance and
   (b) adjusting the distance of the one side of said document image relative to a corresponding side of said text image to reflect said predetermined distance entered into said system in step (a) to cause said one side of said document image to coincide with the corresponding edge of said paper when said document image is printed.

2. The method set forth in claim 1 in which said corresponding edge of said paper is the top edge of said paper.

3. The method set forth in claim 1 in which said corresponding edge of said paper is the left edge of said paper.

4. The method set forth in claim 1 in which said images each have a top side and a left side further including the step of
   (c) adjusting said left side of said document image relative to said left side of said text image to reflect another one of said parameters entered into said system in step (a) to cause said left side of said document image to coincide with the left edge of said paper.

5. The method set forth in claim 2 in which said system generates a printable datastream including printer control codes for printing said document image and said step of adjusting said top side of said document image to coincide with said top edge of said paper includes the steps of;
   (1) developing a printer control code sequence from said parameters entered into said system in step (a) to reflect the difference in the vertical distance between the position of said top edge of said paper at said initial print position relative to said home position and the vertical distance between the position of the first line of said text image relative to the top side of said document image, and
   (2) inserting said developed code sequence into said printable datastream that is sent to said printer to print said document image.

6. The method recited in claim 5 in which said step of developing said code sequence includes the step of (a) comparing said vertical distances and issuing at least one index code to decrease said difference.

7. The method recited in claim 6 in which said comparing step indicates that said difference has a value which generates a reverse index code that causes said paper to move vertically in the reverse index direction to reach the desired position.

8. The method recited in claim 7 in which said printer has an indexing mechanism and in which said reverse index code indexes one line past said desired position to permit said indexing mechanism of the printer to be tensioned in the forward direction by a forward index operation to the desired position prior to printing.

9. The method recited in claim 6 in which said step of comparing is repeated until the distance between the top edge of the paper and the top side of said document image is less than the vertical distance moved by one index operation at the current line spacing of said printer.

10. The method set forth in claim 9 in which said adjusting step includes the step of developing a line space adjustment control code to set said line spacing of said printer to a maximum value prior to indexing to minimize the number of indexing operations and entering said line spacing control code into said printable datastream.

11. The method set forth in claim 10 in which said adjusting step includes the steps of developing a minimum line spacing adjustment control code to set said line spacing of said printer to a minimum value prior to indexing, and entering said minimum line spacing control into said printable datastream in response to said step of comparing indicating that the distance remaining is less than the distance moved by an index operation when set to said maximum value.

12. The method set forth in claim 4 in which said system generates a printable datastream including printer control codes for printing said text image and said step of adjusting said left side includes the steps of, (3) developing a printer control code from said parameters entered into said system in step (a) to reflect the difference in the horizontal distance between the position of the left edge of said paper at said initial print position relative to said home position, and the horizontal distance between the left side of said document image and the left side of said text image, and (4) inserting said printer control code into said printable datastream that is sent to said printer to print said document image.

13. The method recited in claim 12 in which said step of developing includes the step of generating a Set Left Margin control code having a value which reflects the position of said left margin in said document image and the difference in the horizontal positions of the left side of said document image relative to the left edge of said paper when said paper is positioned at its initial print position.

14. The method recited in claim 13 in which said step of interactively entering includes the step of displaying a menu to said operator having a plurality of entries which assists said operator in entering into said system predetermined said paper positioning parameters for said printer.

15. The method recited in claim 14 in which one of said entries is a parameter to set the minimum top margin permitted by the printer expressed in fractions of an inch and includes a choice of numbers for the numerator of said fraction to establish a range of settings from 0 to 5 inches.

* * * * *

UNITED STATES PATENT AND TRADEMARK OFFICE
CERTIFICATE OF CORRECTION

PATENT NO. : 4,656,602

DATED : April 7, 1987

INVENTOR(S) : P. T. Berkland et al

It is certified that error appears in the above—identified patent and that said Letters Patent is hereby corrected as shown below:

Title, delete "OF", first occurrence, and substitute --TO--.

Abstract, line 1, delete "controls", and substitute --to control--.

Signed and Sealed this

Twelfth Day of April, 1988

Attest:

DONALD J. QUIGG

Attesting Officer

Commissioner of Patents and Trademarks